(12) United States Patent
Chow et al.

(10) Patent No.: US 8,798,530 B2
(45) Date of Patent: Aug. 5, 2014

(54) ADAPTIVE OFFSET-COMPENSATING DECISION-FEEDBACK RECEIVER

(75) Inventors: Alex Chow, Palo Alto, CA (US); Robert J. Drost, Los Altos, CA (US); Robert David Hopkins, Hayward, CA (US)

(73) Assignee: Oracle America, Inc., Redwood Shores, CA (US)

( * ) Notice: Subject to any disclaimer, the term of this patent is extended or adjusted under 35 U.S.C. 154(b) by 863 days.

(21) Appl. No.: 12/494,492

(22) Filed: Jun. 30, 2009

(65) Prior Publication Data

US 2010/0329390 A1 Dec. 30, 2010

(51) Int. Cl.
*H04B 5/00* (2006.01)

(52) U.S. Cl.
USPC ............ 455/41.1; 375/319; 375/340

(58) Field of Classification Search
USPC ................. 455/41.1; 375/319, 340
See application file for complete search history.

(56) References Cited

U.S. PATENT DOCUMENTS

| | | | | |
|---|---|---|---|---|
| 5,796,781 | A * | 8/1998 | DeAndrea et al. | 375/288 |
| 7,496,155 | B1 * | 2/2009 | Lu et al. | 375/326 |
| 7,605,660 | B1 * | 10/2009 | Kobayashi | 330/308 |
| 7,715,420 | B1 * | 5/2010 | Drost et al. | 370/419 |
| 2002/0080883 | A1 * | 6/2002 | Tamura et al. | 375/257 |
| 2005/0157780 | A1 * | 7/2005 | Werner et al. | 375/232 |
| 2005/0157781 | A1 * | 7/2005 | Ho et al. | 375/233 |
| 2007/0009066 | A1 * | 1/2007 | Fredriksson | 375/326 |
| 2007/0126480 | A1 * | 6/2007 | McQuirk et al. | 327/58 |
| 2008/0056344 | A1 * | 3/2008 | Hidaka | 375/232 |
| 2008/0057900 | A1 * | 3/2008 | Fang et al. | 455/296 |
| 2009/0196384 | A1 * | 8/2009 | Staszewski et al. | 375/346 |
| 2010/0046683 | A1 * | 2/2010 | Beukema et al. | 375/355 |
| 2010/0284452 | A1 * | 11/2010 | Allen | 375/220 |

OTHER PUBLICATIONS

Chow, Alex et al., "An Active Feedback Sense Amplifier for Proximity Communication", Sun Microsystems, SML#2007-0334, pp. 1-11.
Ho, Ron et al., "Refreshing receivers using extra bits", Sun Microsystems Laboratories, SML#:2006-0006, Jan. 3, 2006, pp. 1-4.
Schauer, Justin et al., "Biasing Floating Nodes with a Leaky Transistor", Jan. 5, 2005, Sun Microsystems Laboratories, SML# 2005-0641, pp. 1-3.

(Continued)

*Primary Examiner* — Nay A Maung
*Assistant Examiner* — Erica Fleming-Hall
(74) *Attorney, Agent, or Firm* — Park, Vaughan, Fleming & Dowler LLP; Steven E. Stupp

(57) ABSTRACT

A circuit that receives input signals from a transmitter via proximity communication, such as capacitively coupled proximity communication, is described. Because proximity communication may block DC content, the circuit may restore the DC content of input signals. In particular, a refresh circuit in the circuit may short inputs of the circuit to each other at least once per clock cycle (which sets a null value). Furthermore, a feedback circuit ensures that, if there is a signal transition in the input signals during a current clock cycle, it is passed through to an output node of the circuit. On the other hand, if there is no signal transition in the input signals during the current clock cycle, the feedback circuit may select the appropriate output value on the output node based on the output value during the immediately preceding clock cycle.

17 Claims, 15 Drawing Sheets

(56) References Cited

OTHER PUBLICATIONS

Drost, Robert J., et al., "Proximity Communication", IEEE Journal of Solid-State Circuits, vol. 39, No. 9, Sep. 2004, pp. 1529-1535.

Hopkins, David et al., "Circuit Techniques to Enable 430Gb/s/mm2 Proximity Communication", ISSCC 2007/Session 20/ TD: Proximity Data and Power Transmission/ 20.7, pp. 368, 369, 609.

* cited by examiner

ADAPTIVE OFFSET-COMPENSATING DECISION-FEEDBACK RECEIVER

BACKGROUND

1. Field

The present disclosure relates to a receiver for receiving signals communicated via proximity communication. More specifically, the present disclosure relates to a receiver that includes adaptive offset compensation and decision feedback.

2. Related Art

Proximity communication is an input/output (I/O) technology that allows chips to communicate through capacitive signaling. Although proximity communication can potentially provide much higher I/O density and lower power consumption, detecting signals that are communicated using proximity communication can be challenging. In particular, signals coupled onto proximity connectors or nodes of a receiving chip can be very small (on the order of 1 mV). Furthermore, because capacitors block DC voltages, the receiving nodes often need to be biased to appropriate DC levels.

Furthermore, detecting small signals over a capacitively coupled interface can pose significant challenges in the design of fast, reliable data receivers. For example, input offset(s) subtract from the received signal, which degrades receiver sensitivity. Therefore, for robust communication, offset cancellation is typically used, especially in advanced fabrication processes in which transistor-mismatch effects are more significant.

In addition, the input nodes of amplifiers on the receiving chip typically need to be biased to voltage levels where the amplifiers have adequate gain. One existing technique for solving this problem uses a transistor in sub-threshold operation to slowly bias a floating node. In this case, the source, body, and gate terminals are all coupled to a bias voltage, such that the transistor is off and the node is biased using the transistor's leakage current. However, in this technique a minimum transition frequency in the incoming signal is usually needed. Otherwise, all of the nodes will eventually drift toward the bias voltage, and the signal will be erased. Furthermore, if the signal is not DC-balanced, the DC levels on the two terminals of a differential amplifier may also drift apart, which reduces the voltage margin. As a consequence, this existing technique typically imposes restrictions on the data pattern through the channel, which often can only be ensured by performing coding at a higher level.

In another existing technique for biasing the amplifiers on the receiving chip, the floating nodes are biased by periodically 'refreshing' all channels. For example, every so often, the channels are stopped, and all the floating nodes are precharged to the appropriate bias levels. However, because this technique requires that communication be stopped at periodic intervals while the refresh occurs, significant architectural complexities can be introduced into systems. Alternatively, extra communication channels may be used, and data channels may be rotated to these extra channels while the data channels are being refreshed. While this approach can hide the complexity of the refresh mechanism from the overall system architecture, it requires precise coordination between the transmitting and receiving chips to ensure proper synchronization of the refresh channels, which can be difficult and expensive to implement.

Hence, what is needed is a circuit which receives signals communicated via proximity communication without the above-described problems.

SUMMARY

One embodiment of the present disclosure provides a circuit that includes a receiver circuit having inputs that are electrically coupled to receiver proximity connectors, and which receive input signals via proximity communication. The circuit also includes a refresh circuit that shorts the inputs to one another at least once per clock cycle. Moreover, the circuit includes a feedback circuit, which is electrically coupled to outputs from the receiver circuit and an output node of the circuit, that provides an output value on the output node corresponding to a signal transition in the input signals during a current clock cycle and, if there is no signal transition during the current clock cycle, that provides the output value on the output node based on the output value during an immediately preceding clock cycle.

Note that the proximity communication may occur via: capacitive coupling to transmitter proximity connectors, inductive coupling to the transmitter proximity connectors, and/or optical coupling to the transmitter proximity connectors. Furthermore, DC content of the input signals may be lost during the proximity communication. Consequently, the feedback circuit may restore the DC content by providing the output value on the output node based at least in part on the output value during the immediately preceding clock cycle.

In some embodiments, the circuit is disposed on an integrated circuit, and the proximity communication is with another circuit on the integrated circuit or with another integrated circuit (i.e., intra- or inter-chip proximity communication).

In some embodiments, the circuit includes a first sense amplifier and a second sense amplifier, which are each electrically coupled to the outputs from the receiver circuit and a corresponding one of the inputs to the feedback circuit. These sense amplifiers provide signals to the inputs of the feedback circuit.

Additionally, the circuit may include a first voltage-threshold node and a second voltage-threshold node, which are electrically coupled to the first sense amplifier. These voltage-threshold nodes receive a first voltage threshold and a second voltage threshold that, respectively, bias the first sense amplifier toward a logical high state and a logical low state. Furthermore, the circuit may include a third voltage-threshold node and a fourth voltage-threshold node, which are electrically coupled to the second sense amplifier. These additional voltage-threshold nodes receive the second voltage threshold and the first voltage threshold so that the second sense amplifier is biased toward opposite logical states than the first sense amplifier. Note that the first threshold voltage and the second threshold voltage may be fixed. Alternatively, the first threshold voltage and the second threshold voltage may be dynamically adapted based at least in part on a voltage swing of the input signals. For example, the first threshold voltage and the second threshold voltage may be dynamically adapted using a sampler circuit in a side channel that approximates the circuit.

In some embodiments, the circuit includes capacitors between the outputs from the receiver circuit and inputs to the first sense amplifier and the second sense amplifier. These capacitors may provide voltage offset compensation. Furthermore, the feedback circuit may include: a memory that stores the output value from the immediately preceding clock cycle; and a multiplexer, which is electrically coupled to outputs from the first sense amplifier and the second sense amplifier and which is electrically coupled to the output node. This multiplexer may selectively couple an output of the first sense amplifier or the second sense amplifier to the output node during the current clock cycle based on the stored output value in the memory. Consequently, the feedback circuit may have a path memory of one clock cycle.

Additionally, the circuit may include a delay circuit that is electrically coupled to the multiplexer and the output node. This delay circuit may satisfy setup and hold parameters of the memory. For example, the memory may include a flip-flop.

Another embodiment provides a computer system that includes a semiconductor die that includes the circuit.

Another embodiment provides a method for restoring DC content during proximity communication, which may be performed by the circuit. During the method, the circuit receives the input signals on the inputs via proximity communication. Moreover, the refresh circuit shorts the inputs to each other at least once per clock cycle. Furthermore, the feedback circuit provides the output value on the output node of the circuit which corresponds to the signal transition in the input signals during the current clock cycle and, if there is no signal transition during the current clock cycle, provides the output value on the output node based on the output value during the immediately preceding clock cycle.

BRIEF DESCRIPTION OF THE FIGURES

Note that like reference numerals refer to corresponding parts throughout the drawings. Moreover, multiple instances of the same part are designed by a common prefix separated from an instance number by a dash.

DETAILED DESCRIPTION

Figure 1:
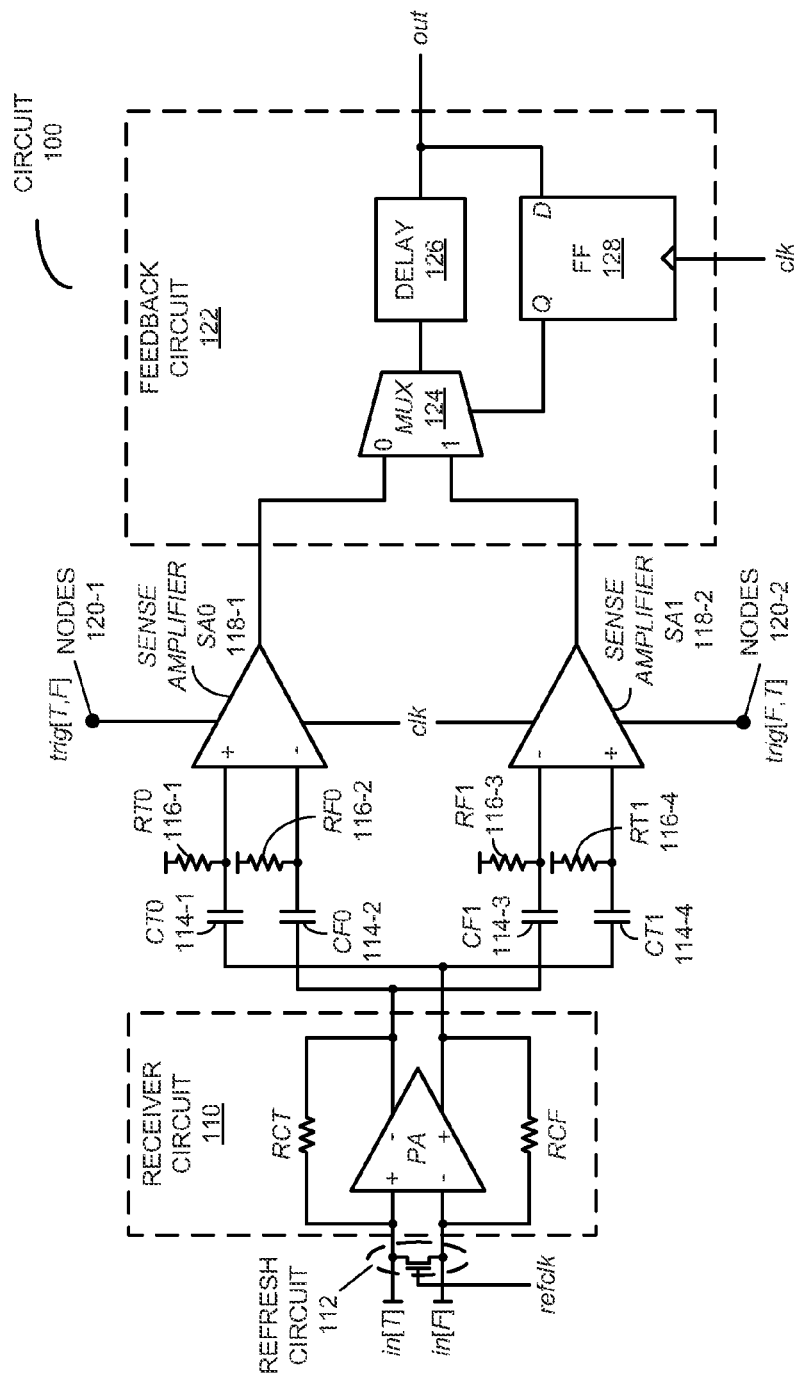
FIG. 1 is a block diagram illustrating a circuit for proximity communication in accordance with an embodiment of the present disclosure.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a circuit, a computer system that includes the circuit, and a method for restoring DC content during proximity communication are described. This circuit may receive input signals from a transmitter via proximity communication, such as capacitively coupled proximity communication. Because proximity communication may block DC content, the circuit may restore the DC content of the input signals. In particular, a refresh circuit in the circuit may short inputs of the circuit to each other at least once per clock cycle (which sets a null value). Furthermore, a feedback circuit ensures that, if there is a signal transition in the input signals during a current clock cycle, it is passed through to an output node of the circuit. On the other hand, if there is no signal transition in the input signals during the current clock cycle, the feedback circuit may select the appropriate output value on the output node based on the output value during the immediately preceding clock cycle.

By restoring the DC content of the input signals, the circuit facilitates communication of information via proximity communication without a minimum signal-transition frequency or a run-length coding constraint on the DC content of the input signals. In addition, the circuit can continue to operate without requiring calibration or without requiring the communication be stopped for a periodic refresh operation. In these ways, the circuit can reduce the complexity and expense of systems that communicate information via proximity communication.

In the discussion that follows, capacitive proximity communication by proximity connectors in a transmitter and a receiver is used as an illustration. However, in other embodiments, the proximity communication can include: conductive coupling, inductive coupling, and/or optical coupling.

We now describe the circuit. In some embodiments, the circuit is an adaptive offset-compensating decision feedback receiver. This circuit can remove the restrictions on the signal-transition frequency and DC balance or content of incoming data without increasing the complexity of the overall system.

Moreover, the circuit may dynamically adjust internal biasing levels to obtain improved or optimal noise margins depending on the received input-signal amplitude. This can be useful during proximity communication because the received input signal can vary by several orders of magnitude depending on the separation between transmitter proximity connectors and receiver proximity connectors.

FIG. 1 presents a block diagram illustrating a circuit 100 for proximity communication. in[T] and in[F] are input nodes that receive differential low-swing input signals coupled from a transmitter via proximity communication. These input signals feed into the respective inputs of a receiver circuit 110, such as a differential continuous preamplifier (PA), which may provide enough amplification of the input signals such that the output of the preamplifier is large enough to overcome any transistor offset(s) in later stages in circuit 100.

Because in[T] and in[F] are capacitively coupled, they are semi-floating and their DC levels may be set such that the preamplifier operates with adequate gain. This may be accomplished through devices RCT and RCF, which can be conceptualized as simple passive resistors. (However, in some embodiments these devices are not passive resistors.) Devices RCT and RCF couple the input and output nodes of the preamplifier (with reversed polarity) to provide negative feedback such that the input and output voltages equilibrate.

Figure 2A:
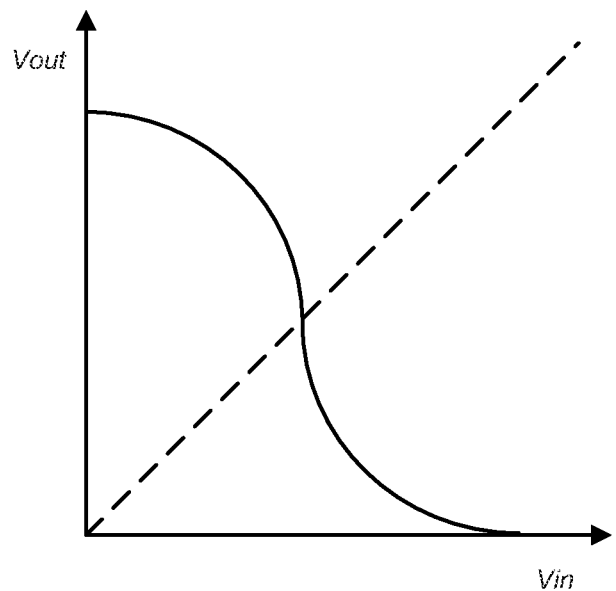
FIG. 2A is a graph illustrating a typical voltage transfer characteristic (VTC) of an inverting amplifier in accordance with an embodiment of the present disclosure.
Figure 2B:
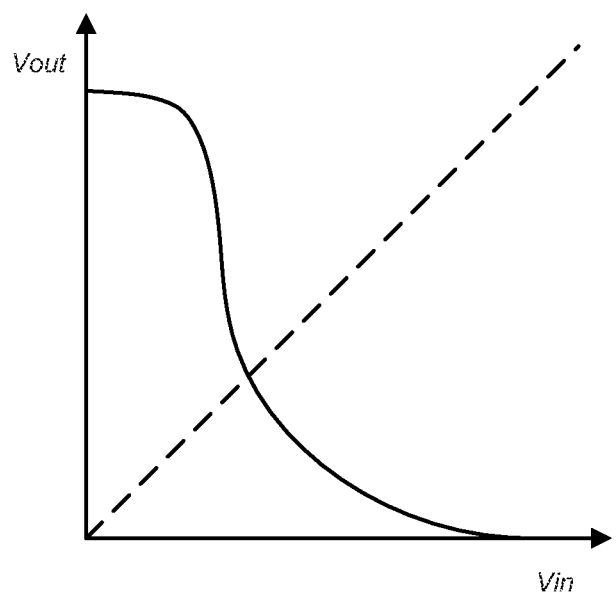
FIG. 2B is a graph illustrating a typical VTC of an inverting amplifier in accordance with an embodiment of the present disclosure.

As shown in FIG. 2A, which presents a graph illustrating a typical voltage transfer characteristic (VTC) of an inverting amplifier, for an inverting amplifier with a symmetric voltage transfer characteristic, this technique biases the inputs so that the amplifier has approximately the highest gain, e.g., where the VTC has the steepest slope. However, as shown in FIG. 2B, for an amplifier with an arbitrary voltage transfer characteristic, this technique may not force the amplifier into high-gain operation. Therefore, care may be taken to ensure that the amplifier has adequate gain at the point where the input and output voltages intersect.

Referring back to FIG. 1, because in[T] and in[F] are capacitively driven, their initial DC bias levels will eventually be restored by the biasing devices RCT and RCF regardless of the data value on the channel. However, if the input signals correspond to a data sequence that consists of a long string of '1' or '0' bits, in traditional non-return-to-zero (NRZ) signaling there will be no signal transition across the channel between the transmitter and the receiver (which includes circuit 100). In this case, the voltage levels on in[T] and in[F] will then slowly drift toward their initial bias levels, and all subsequent data bits before the next signal transition may be corrupted. This problem occurs with many continuous-biasing techniques. As a consequence, many previous implementations of proximity communication included a constraint on the minimum signal-transition frequency in the transmitted data. In particular, the maximum time between signal transitions is often constrained to be shorter than the bias time constants of the floating nodes.

In order to eliminate signal-transition frequency requirements on the transmitted data, the floating nodes in[T] and in[F] may be refreshed on every clock cycle, and the value of the received bit may be used to infer the value of subsequent bits using a feedback circuit 122 (which includes a decision-feedback mechanism). A refresh circuit 112, such as a refresh transistor, may short in[T] and in[F] together, thereby resetting the data lines after every bit has been captured by the preamplifier. (This technique is analogous to return-to-zero or RZ signaling. However, note that the transmitted signal is still NRZ-coded.) Note that in some embodiments refresh circuit 112 is implemented as two separate transistors, one NMOS and one PMOS in parallel, and refclk is a complementary signal. This may help cancel any charge injection due to transitions of refclk.

Figure 3:
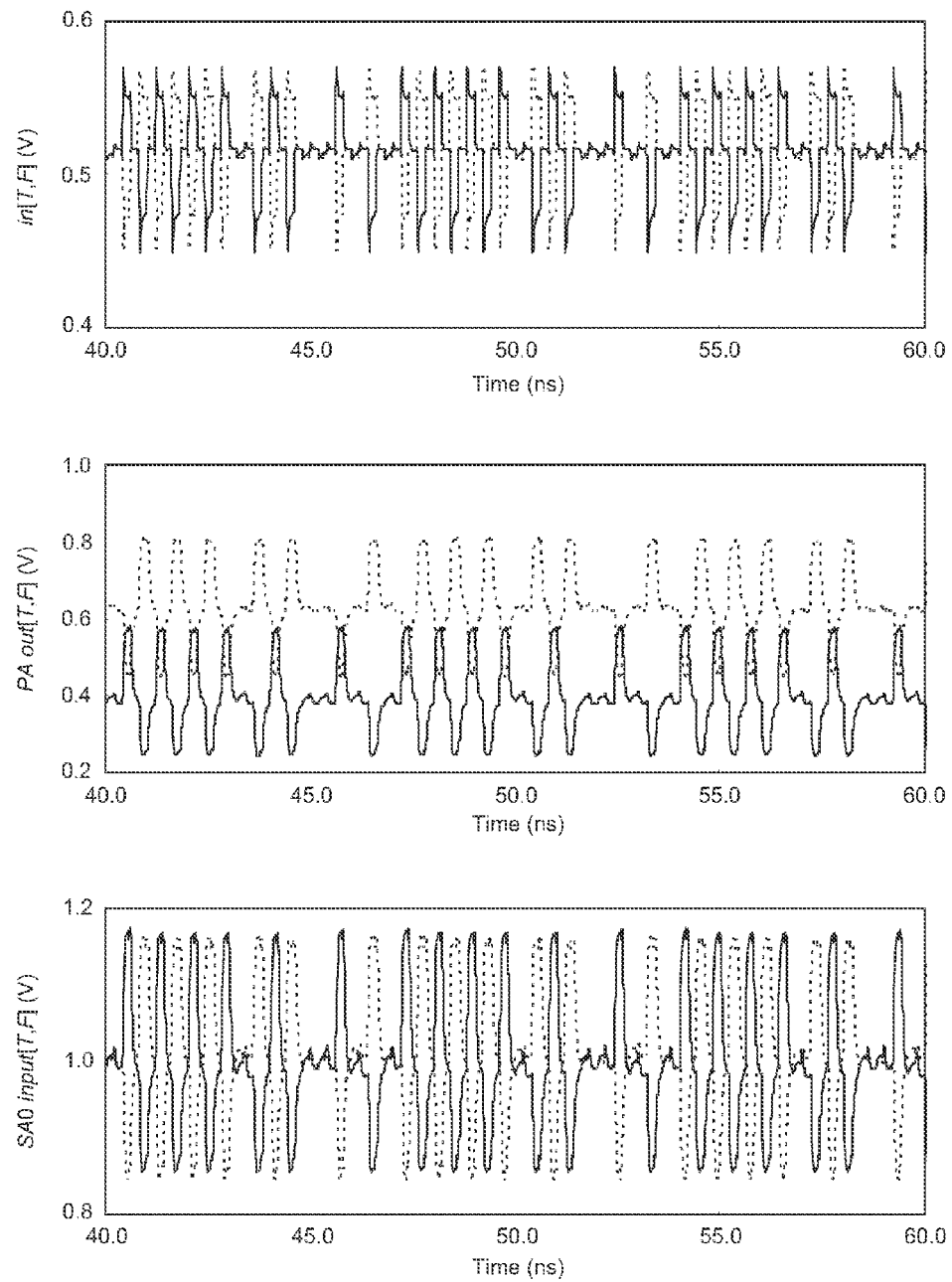
FIG. 3 is a graph illustrating output offset compensation for a preamplifier input offset of 50 mV in accordance with an embodiment of the present disclosure.

As noted previously, preamplifier PA may provide enough amplification of the input signals to overcome any transistor offset in subsequent stages, such as in sense amplifiers SA0 118-1 and SA1 118-2. To compensate for offset in the preamplifier itself, the preamplifier outputs may be AC-coupled to subsequent stages through capacitors CF0, CT0, CT1 and CF1 114. These capacitors block DC levels (and, thus, any voltage offset due to transistor variations in the preamplifier) from propagating to the inputs of the sense amplifiers 118. FIG. 3 presents a graph illustrating this technique for output offset compensation with a preamplifier input offset of 50 mV. Note that the input offset causes a large offset in the output of the preamplifier. However, because this offset is DC, it is blocked by the coupling capacitors 114 (FIG. 1) and, therefore, there is no offset at the inputs of the following sense amplifiers 118 (FIG. 1). Additionally, note that the voltage waveforms at the inputs of sense amplifier SA1 118-2 (FIG. 1) are approximately identical to those shown for sense amplifier SA0 118-1 (FIG. 1).

Figure 4:
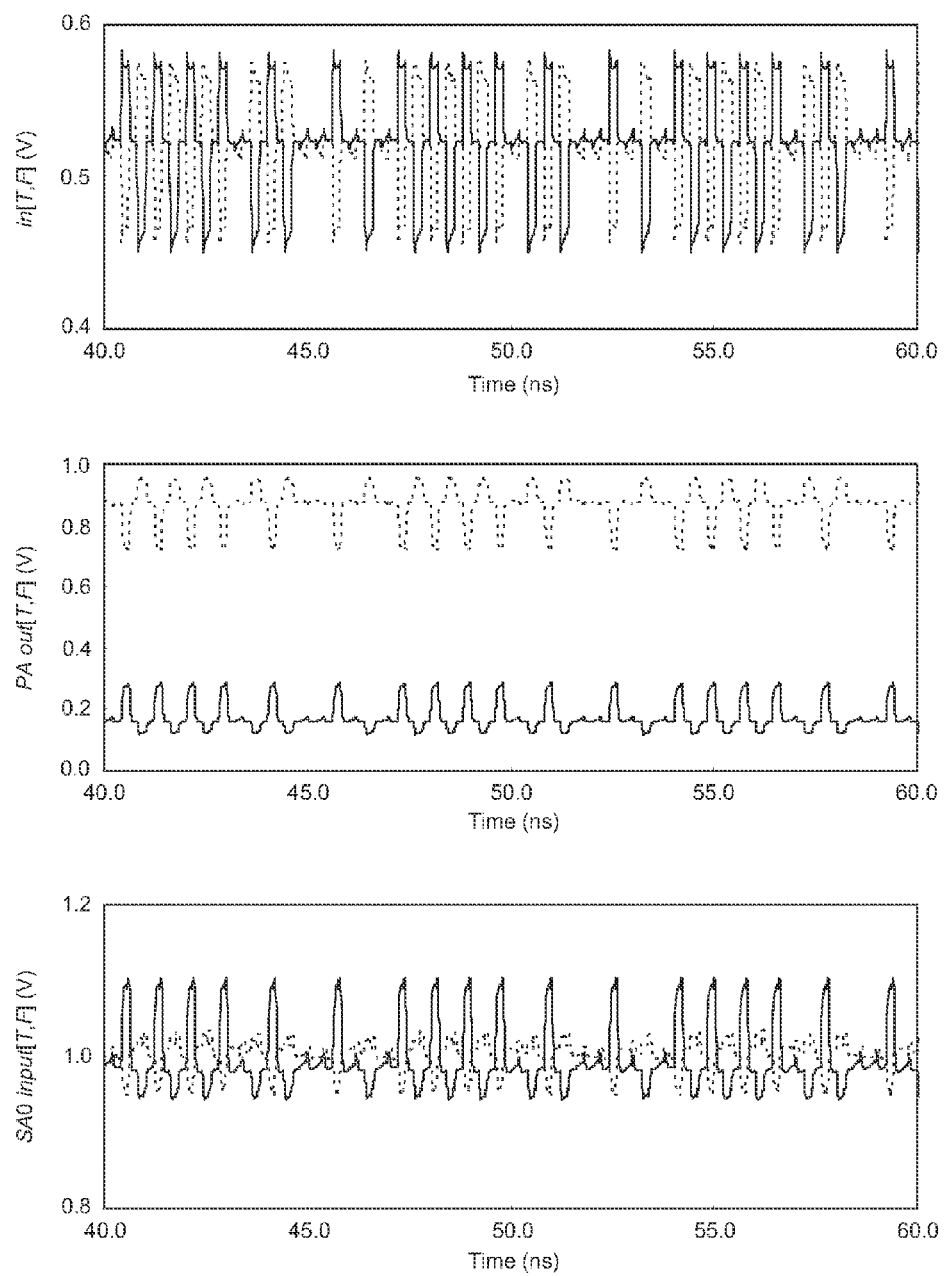
FIG. 4 is a graph illustrating output offset compensation for a preamplifier input offset of 200 mV in accordance with an embodiment of the present disclosure.

This output offset-compensation technique eliminates voltage offset in the preamplifier. However, to ensure proper operation of circuit 100 (FIG. 1), the offset may be required to be small enough that it does not saturate the preamplifier. If the input offset voltage or the preamplifier gain is too large, the output levels may swing close to the power supply rails, and there may be inadequate voltage range for the actual signal, resulting in signal distortion. This is shown in FIG. 4, which is a graph illustrating the output offset-compensation technique for a preamplifier input offset of 200 mV. In this example, the offset saturates the preamplifier so that the output rising and falling transitions become unequal. Therefore, the inputs to sense amplifiers 118 (FIG. 1) in the next stage are heavily distorted. Note that the input offset voltage of 200 mV used in this example is unrealistically high. As a consequence, saturation is not an issue for typical offset voltages and a preamplifier gain of 10 or lower.

Figure 5:
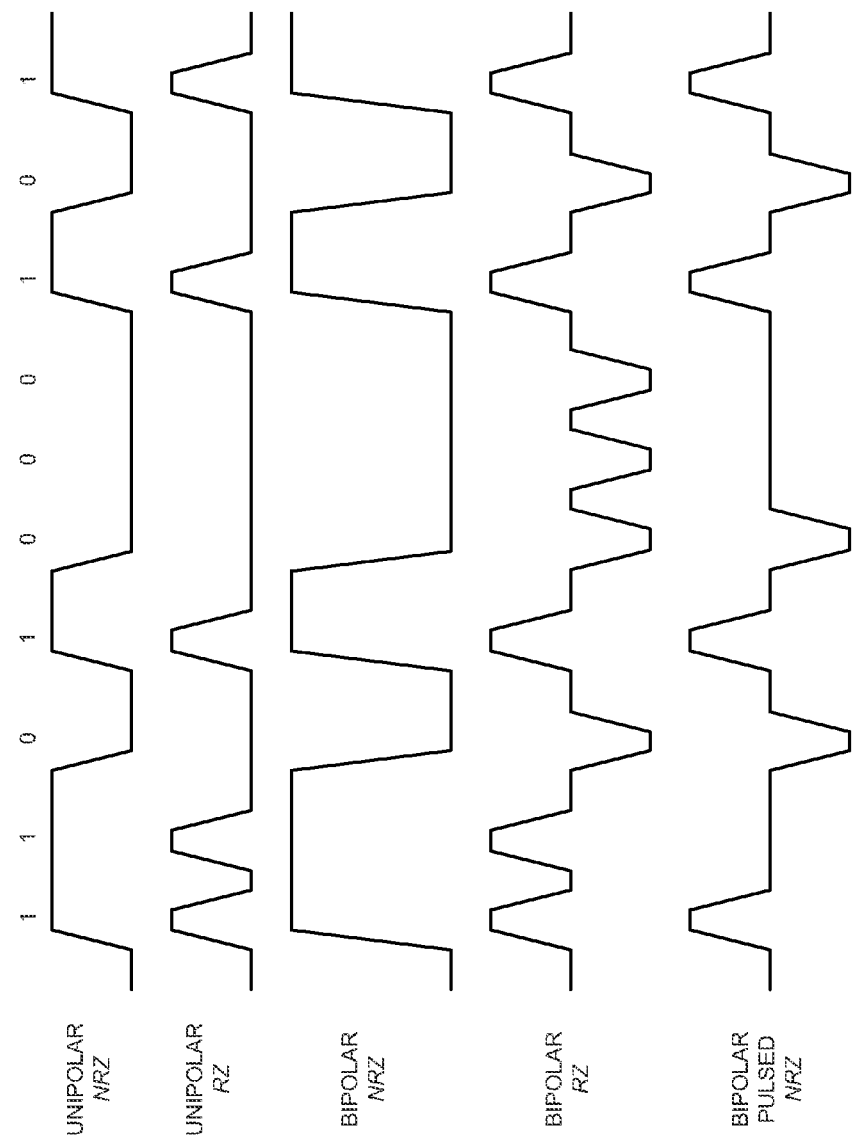
FIG. 5 is a timing diagram illustrating unipolar non-return-to-zero (NRZ) signaling, unipolar return-to-zero (RZ) signaling, bipolar NRZ signaling, bipolar RZ signaling and bipolar pulsed-NRZ signaling in accordance with an embodiment of the present disclosure.

Referring back to FIG. 1, the outputs of the preamplifier are AC-coupled through capacitors CF0, CT0, CT1, and CF1 114 to the inputs of sense amplifiers SA0 118-1 and SA1 118-2, which are biased to VDD through devices RF0, RT0, RT1, and RF1 116. In some embodiments, these devices are transistors in sub-threshold operation, with their source, body, and gate terminals all connected to VDD, and which each may have an impedance greater than 1 MΩ. If used to bias data lines carrying NRZ signals, this biasing technique may require a minimum signal-transition frequency. Moreover, if the input signals do not include a signal transition, the bias levels may slowly drift toward the bias voltage, thereby erasing the signal. To avoid this problem, the signals on the inputs to sense amplifiers 118 are encoded using a signaling technique that is sometimes referred to as ddt-NRZ signaling, and which is henceforth referred to as bipolar pulsed-NRZ signaling. (In bipolar pulsed-NRZ signaling, refresh circuit 112 effectively converts the unipolar NRZ signal from the transmitter into a bipolar-RZ-like signal, except that instead of including repeat bits the signal is kept at the NULL level. Said differently, bipolar pulsed-NRZ signaling is similar to taking a time-derivative of a unipolar NRZ signal. As shown in FIG. 5, unipolar signaling uses only two levels, one representing HI and the other representing LO, and bipolar signaling uses three levels: one representing HI, one representing LO, and one representing a NULL state. With NRZ signaling, the signal level is maintained until the signal switches to the opposite value, while with RZ signaling the signal level returns to the NULL state after every bit, i.e., the NULL state is simply the LO value in unipolar signaling. FIG. 5 also shows four possible ways that unipolar and bipolar signaling can be combined with NRZ and RZ signaling, as well as the bipolar pulsed-NRZ signaling.) In particular, as discussed previously, after every clock cycle the input voltages in circuit 100 are equilibrated back to the DC bias levels by refresh circuit 112. Consequently, circuit 100 may not require a minimum transition frequency.

In circuit 100, there are two sense amplifiers 118 operating in parallel. Sense amplifier SA0 118-1 is biased toward the LO state, and sense amplifier SA1 118-2 is biased toward the HI state, such that if both the T and F inputs are at the NULL state, these sense amplifiers produce an output of '0' and '1', respectively.

Figure 6:
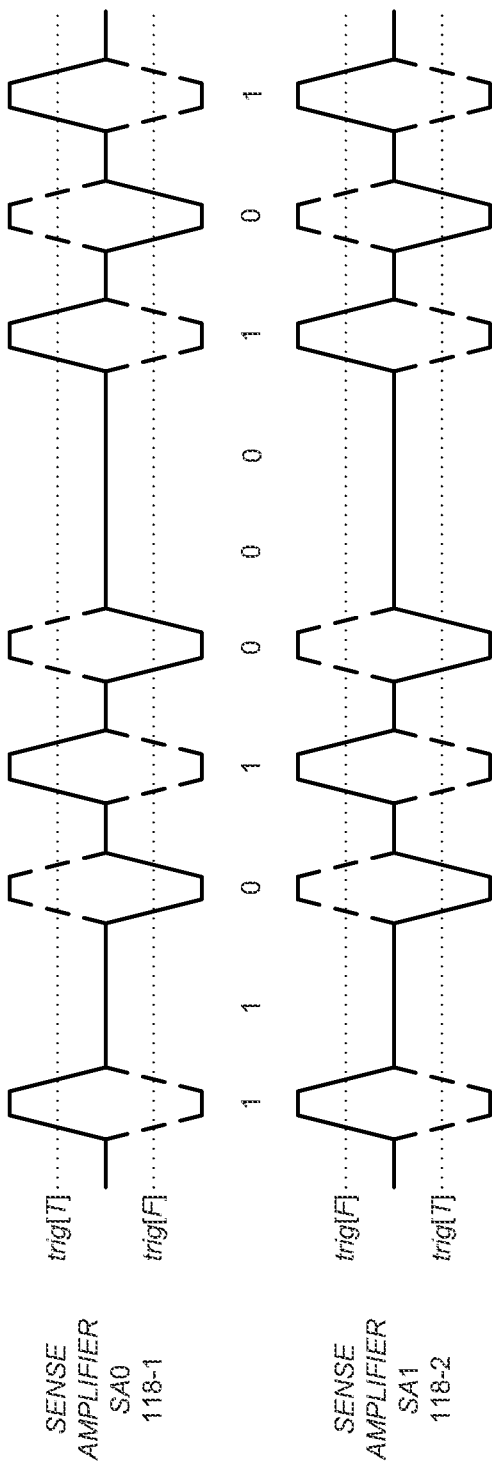
FIG. 6 is a timing diagram illustrating inputs and bias levels of the sense amplifiers in FIG. 1 in accordance with an embodiment of the present disclosure.

Each of sense amplifiers 118 has two trigger voltage inputs, trig[T] and trig[F], which are provided on voltage nodes 120, and which bias a given sense amplifier toward one state. (Assume for now that these trigger voltages are set halfway between the NULL voltage and the maximum and minimum voltages. The generation of these trigger voltages is discussed further below.) As shown in FIGS. 1 and 6, trig[T] and trig[F] are swapped for the two sense amplifiers 118, so that these sense amplifiers are biased toward opposite bits.

Thus, trig[T] and trig[F] are coupled, respectively, to a first voltage-threshold node and a second voltage-threshold node in voltage nodes 120-1 of sense amplifier SA0 118-1, and trig[F] and trig[T] are coupled, respectively, to a third voltage-threshold node and a fourth voltage-threshold node in voltage nodes 120-2 of sense amplifier SA1 118-2. In order for each of sense amplifiers 118 to produce the unbiased output (i.e., an output '1' for sense amplifier SA0 118-1 and an output '0' for sense amplifier SA1 118-2), the T and F inputs must cross the levels of trig[T] and trig[F], respectively.

Figure 7:
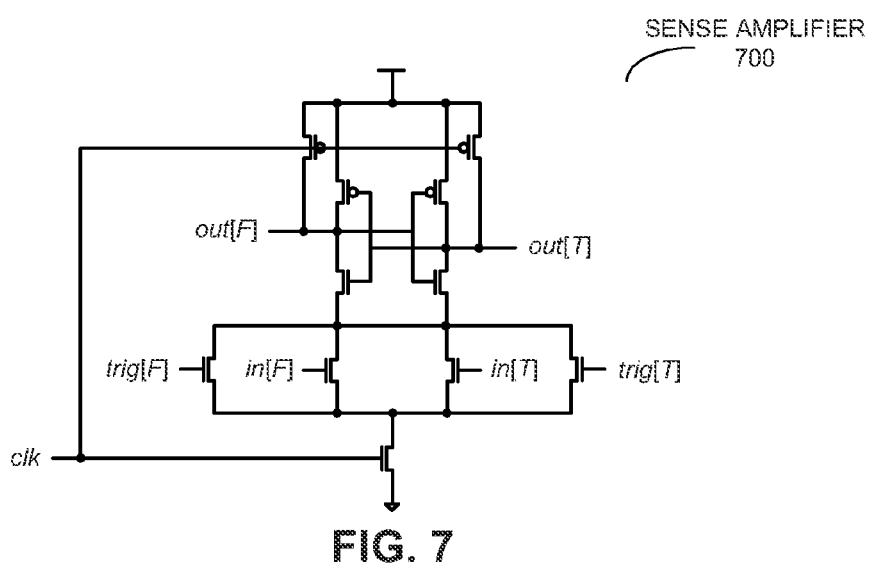
FIG. 7 is a block diagram illustrating a sense amplifier in the circuit of FIG. 1 in accordance with an embodiment of the present disclosure.

FIG. 7 presents a block diagram illustrating an implementation of sense amplifier 700, such as one of sense amplifiers 118 (FIG. 1). Ports in[T,F] are the data input nodes, and trig[T,F] are coupled to the trigger levels generated by a sampler circuit (which is described further below). Recall that the connections to the trigger levels are swapped between the two sense amplifiers 118 (FIG. 1), such that trig[T,F] correspond to [high, low] and [low, high] for sense amplifiers SA0 118-1 and SA1 118-2 (FIG. 1), respectively. Also recall that sense amplifiers SA0 118-1 and SA1 118-2 (FIG. 1) are biased toward an output of '0' and '1', respectively, such that each sense amplifier produces the biased output when both inputs are NULL. The signals trig[T,F] represent the voltage levels that in[T,F] must cross before the output switches to the unbiased state.

Sense amplifier 700 is a clocked, regenerative sense amplifier, with the addition of a pair of transistors controlled by the two trigger levels. These introduce some offset to the input such that the output is at a known state when in[T] equals in[F]. For the trigger-level sampler circuit presented below in FIG. 9, the levels of 'high' and 'low' are approximately halfway between NULL and the maximum signal swing. These are the desired trigger levels. They can be used directly, and therefore, the sizes of the trigger input transistors can be the same as those of the data input transistors. In other embodiments, the sampler circuit may produce levels of 'high' and 'low' that correspond to the actual maximum and minimum signal voltages. In these embodiments, the size of the trigger input transistors can be about one-half the size of the data input transistors.

Referring back to FIG. 6, note that repeat bits in the input signals (i.e., bits that are unchanged from the previous bit) are not represented as pulses. Instead, the voltage levels are held at the NULL state. Because sense amplifiers 118 (FIG. 1) are biased, each sense amplifier still produces a consistent output. However, only one of the two outputs is correct, and the one that corresponds to the previous bit value should be chosen. Referring back to FIG. 1, this is the function of the decision-feedback mechanism in feedback circuit 122, which includes: a multiplexer (MUX) 124, delay 126 (such as a delay line), and flip-flop (FE) 128. Note that the delay of delay 126 may be chosen to satisfy setup and hold time requirements of flip-flop 128.

Figure 8:
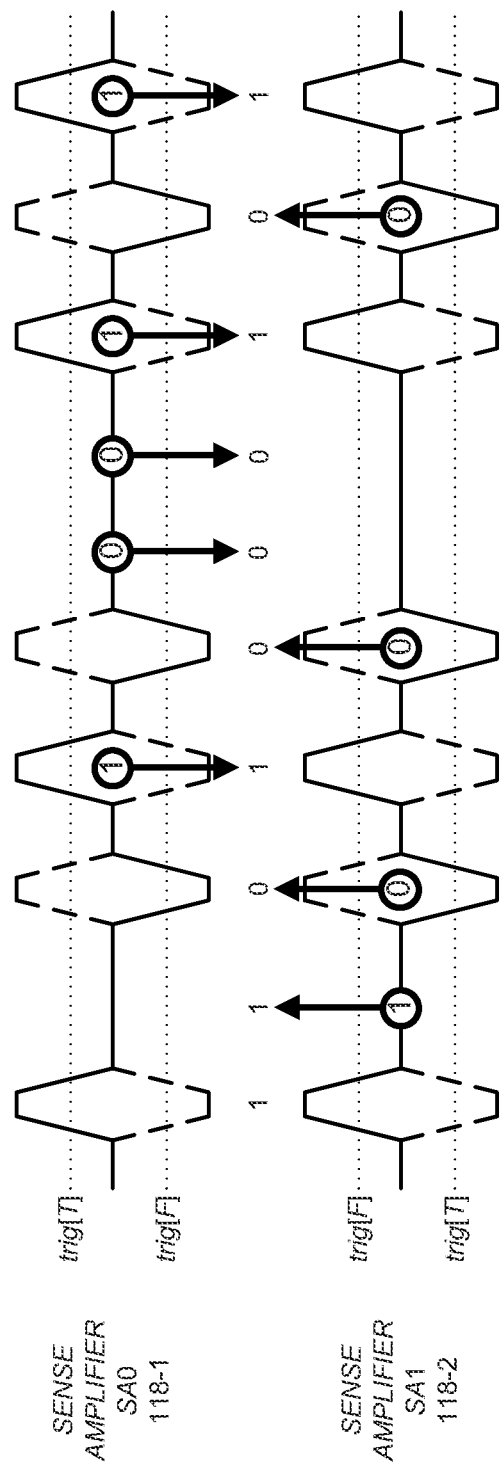
FIG. 8 is a timing diagram illustrating the choice of sense-amplifier outputs in FIG. 1 in accordance with an embodiment of the present disclosure.

FIG. 8 presents a timing diagram illustrating the output of each of the two sense amplifiers 118 (FIG. 1), and the choice for the final output value. Note that when there is a signal transition in the input signals, both sense amplifiers 118 (FIG. 1) agree. However, when there is no signal transition, each of sense amplifiers 118 (FIG. 1) chooses its own biased value, and the output in the immediately preceding clock cycle dictates which of sense amplifiers 118 (FIG. 1) is to be used. In particular, the stored value in flip-flop 128 (FIG. 1) determines which sense amplifier output is provided to the output node by multiplexer 124 (FIG. 1). Furthermore, note that on startup the first bits may not be detected correctly because the output is arbitrary when the first input signal-transition arrives. This problem may be addressed using techniques known to one of skill in the art.

The trigger levels trig[T] and trig[F] can either be fixed voltages generated from a bias generator, or they can be adaptively generated using a side channel. This latter technique may be useful for proximity communication because the trigger levels can adapt to the signal swing in order to maximize noise margins.

Figure 9:
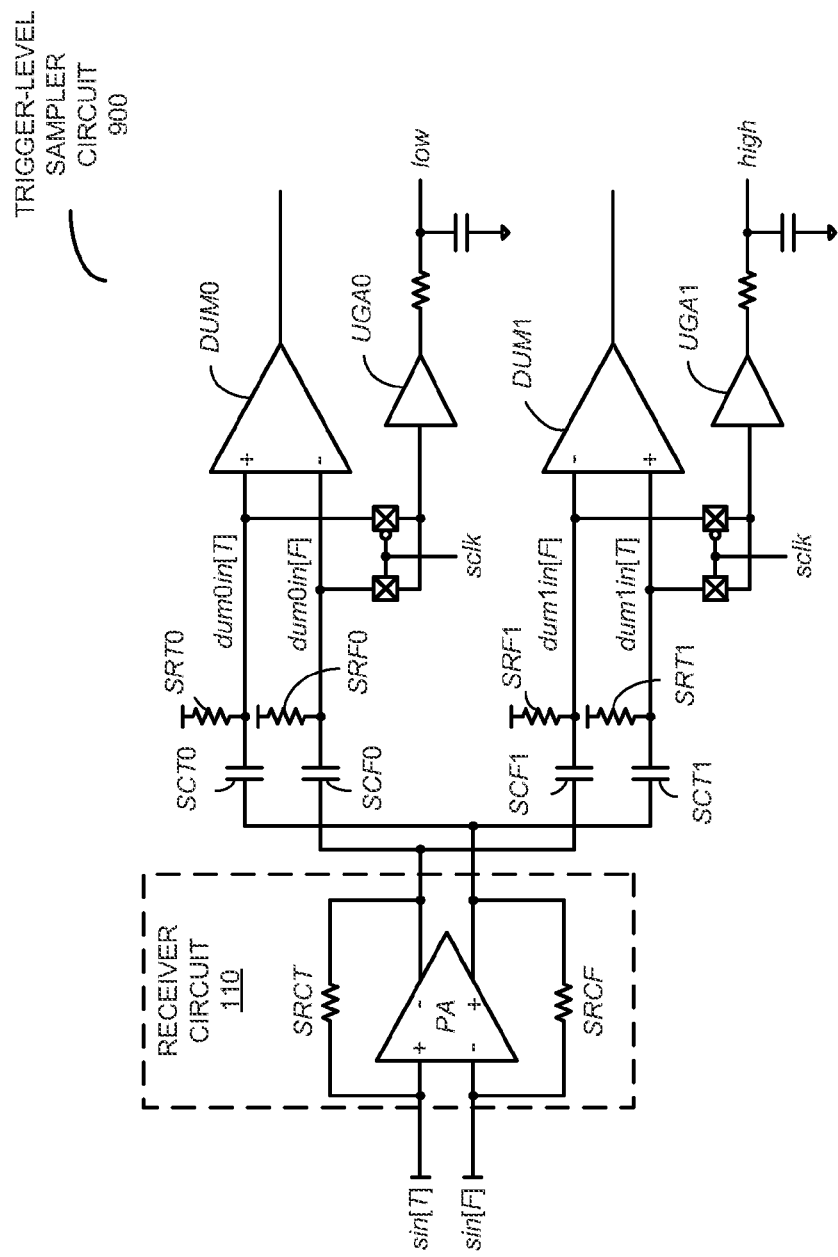
FIG. 9 is a block diagram illustrating a trigger-level sampler circuit in accordance with an embodiment of the present disclosure.

FIG. 9 presents a block diagram illustrating a trigger-level sampler circuit 900 that adaptively produces the two trigger levels. The two outputs of this sampler circuit, 'high' and 'low', correspond, respectively, to trig[T,F] for sense amplifier SA0 118-1 (FIG. 1) and trig[F,T] for sense amplifier SA1 118-2 (FIG. 1). Ideally, the voltage of 'high' may be halfway between the NULL bias level and the maximum voltage reached after a positive signal transition. Similarly, the voltage of 'low' may be halfway between the NULL bias level and the minimum voltage reached after a negative signal transition.

Trigger-level sampler circuit 900 may be very similar to circuit 100 (FIG. 1). The only notable differences are that: feedback circuit 122 (FIG. 1) is eliminated; sense amplifiers 118 (FIG. 1) are replaced with dummy amplifiers or dummy loads (DUM0 and DUM1)); some sampling circuitry has been added; and refresh circuit 112 (FIG. 1) has been removed.

In order to generate 'high' and 'low' correctly, the signal swings in trigger-level sampler circuit 900 should be similar to those in circuit 100 (FIG. 1). Furthermore, the layout and size of the proximity-communication connections or pads, and the sizes of all components, should be similar to or match those in circuit 100 (FIG. 1). This helps ensure that noise margins remain consistent and independent of variables such as separation between transmitter proximity connectors and receiver proximity connectors. Note that the elimination of refresh circuit 112 (FIG. 1) and the addition of the sampling circuitry may alter the loading on some nodes. While the components that are added or eliminated are typically small, trigger-level sampler circuit 900 may be adjusted for these effects by adding dummy loads or reducing sizes of other components at the affected nodes.

In trigger-level sampler circuit 900, the input signals at nodes sin [T,F] may be a clock signal, which is capacitively coupled through proximity communication in the same way that data input signals are coupled to circuit 100 (FIG. 1). Furthermore, the inputs to the dummy sense amplifiers, dum0in[T,F] and dum1in[T,F], may be amplified copies of sin [T,F], but biased around VDD. Note that because the input signals are not refreshed in trigger-level sampler circuit 900, there is no longer a NULL state. Nonetheless, even though trigger-level sampler circuit 900 imposes minimum signal-transition frequency requirements on the channel, this is inconsequential because the signal through the channel can be a clock signal.

Figure 10:
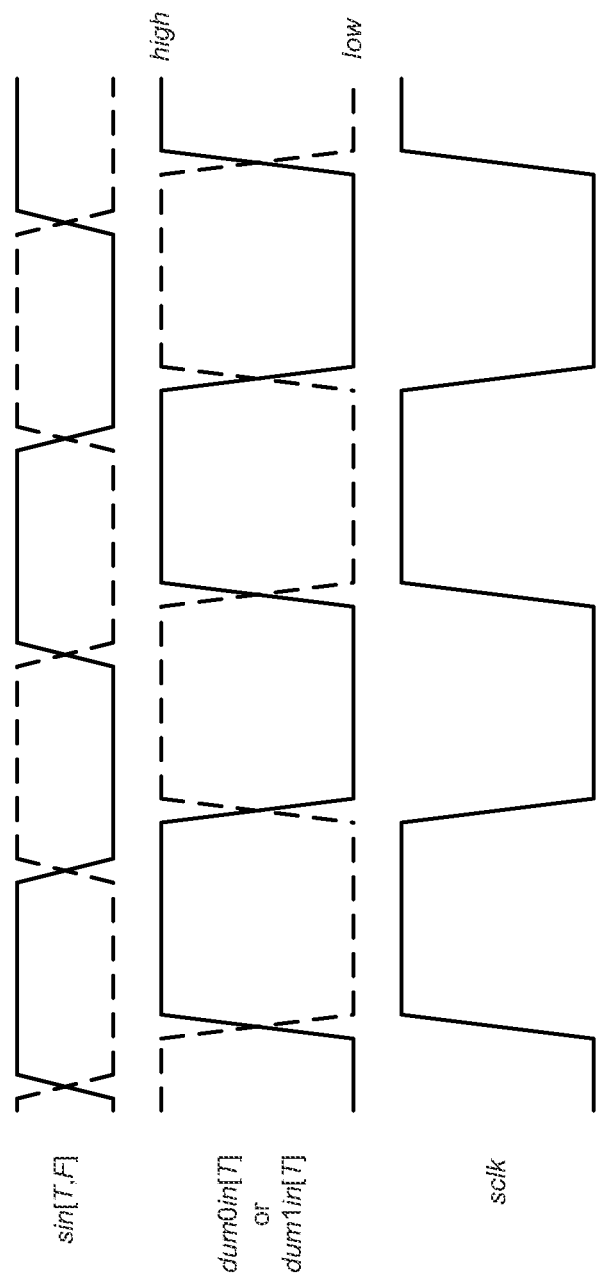
FIG. 10 is a timing diagram illustrating signals for the trigger-level sampler circuit in FIG. 9 in accordance with an embodiment of the present disclosure.

FIG. 10 presents a timing diagram illustrating signals for the trigger-level sampler circuit 900 (FIG. 9). sclk is a time-delayed copy of sin [T]. Note that the delay typically matches that from the preamplifier inputs to the inputs to dummy sense amplifiers DUM0 and DUM1. With the sampling pass-gates arranged as shown in FIG. 9, the '0' and '1' branches sample the minimum and maximum voltages at the dummy sense-amplifier inputs, providing the 'low' and 'high' trigger levels, respectively.

Note that even though 'high' and 'low' are, respectively, the maximum and minimum voltages of the dummy sense-amplifier inputs, their voltages are only approximately halfway between NULL and the maximum and minimum voltages at the actual data sense-amplifiers inputs in circuit 100 (FIG. 1). This is because the differential signal swing in trigger-level sampler circuit 900 (FIG. 9) is only half that in circuit 100 (FIG. 1), because the sampler signals are not equilibrated to NULL. A comparison between FIGS. 6 and 10 clarifies this difference.

Referring back to FIG. 9, devices UGA0 and UGA1 are unity-gain amplifiers that buffer the trigger levels so that they can be distributed to many circuits (such as circuit 100 in FIG. 1). A low-pass filter may be added before the output to remove any high-frequency disturbances due to charge injection from the sampling pass-gates.

Adaptively setting the 'high' and 'low' trigger levels at halfway between NULL and the maximum and minimum levels, respectively, distributes the noise margin equally between the T and F halves of the preamplifier in circuit 100 (FIG. 1), and results in equal minimum noise margins for '1' and '0'. The minimum noise margin is then equal to the single-ended signal swing regardless of the actual swing itself, and improves for larger signals. Note that this minimum noise margin is the same as that offered by traditional differential NRZ signaling.

Figure 11:
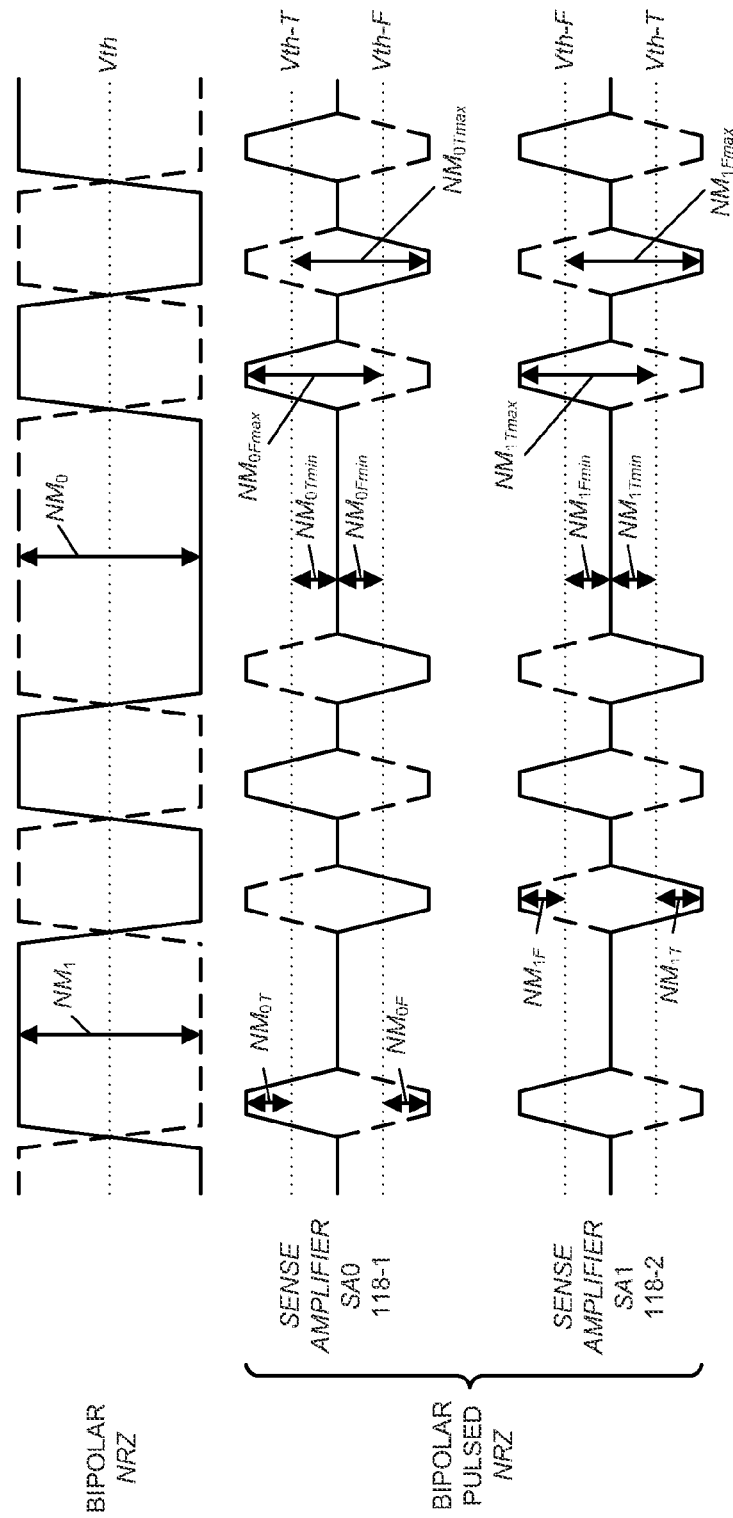
FIG. 11 is a timing diagram comparing noise margins between NRZ and bipolar pulsed NRZ signaling in accordance with an embodiment of the present disclosure.

FIG. 11 presents a timing diagram comparing noise margins between NRZ and bipolar pulsed NRZ signaling. Because each of sense amplifiers 118 (FIG. 1) is biased, it has different noise margins when detecting its preferred bit, depending on whether or not a signal transition occurs. The maximum noise margin is approximately three times the minimum noise margin. For a given sense amplifier SAx, the noise margins are $$NM_{x-min} = NM_{xT-min} + NM_{xF-min},$$

$$NM_{x-max} = NM_{xT-max} + NM_{xF-max}, \text{ and}$$

$$NM_{\bar{x}} = NM_{\bar{x}T} + NM_{\bar{x}F}.$$

Note that the maximum noise margin provides a slight benefit in the bit error rate (BER) of circuit 100 (FIG. 1). Assuming Gaussian noise sources, and that the BER is low enough that secondary errors due to incorrect decision feedback can be neglected, the BER can be expressed as $$BER = (Pr_1^2 + Pr_0^2)\exp\left(-\frac{9}{2}\gamma_0^2\right) + 2Pr_1 Pr_0 \exp\left(-\frac{1}{2}\gamma_0^2\right),$$

where $Pr_1$ and $Pr_0$ are the bit probabilities of '1' and '0', respectively, and $\gamma_0$ is the signal-to-noise ratio (SNR), i.e., Vswing/$V_N$ (where Vswing is the single-ended signal swing, and $V_N$ is the RMS noise voltage). For traditional NRZ signaling, the BER is $$\exp\left(-\frac{1}{2}\gamma_0^2\right).$$

Therefore, for equal bit probabilities and a high SNR, the BER is roughly halved. However, note that, even though the per-bit error probability is lower, if a bit error does occur, all subsequent repeat bits will be detected incorrectly because of the decision feedback mechanism in feedback circuit 122 (FIG. 1). This also results in a BER of $$\exp\left(-\frac{1}{2}\gamma_0^2\right)$$

for equal probabilities of '1' and '0' bits.

We now describe simulation results for one channel of circuit 100 (FIG. 1) using trigger-level sampler circuit 900 (FIG. 9) to adaptively generate the trigger levels. (Note that the circuit was also built using 9-metal-layer, 90 nm CMOS technology.) These simulation results assume typical voltage (1.0V), temperature (40° C.), and process (TT) environments, although operation of the circuit has also been verified at other PVT corners, as well as over process variations. In the simulations, the bit rate was 2.5 Gbps, using a double-data-rate (DDR) clock at 1.25 GHz. Furthermore, the proximity-communication connectors or pads had an area of 18×18 μm² on a pitch of 24×24 μm².

Figure 12:
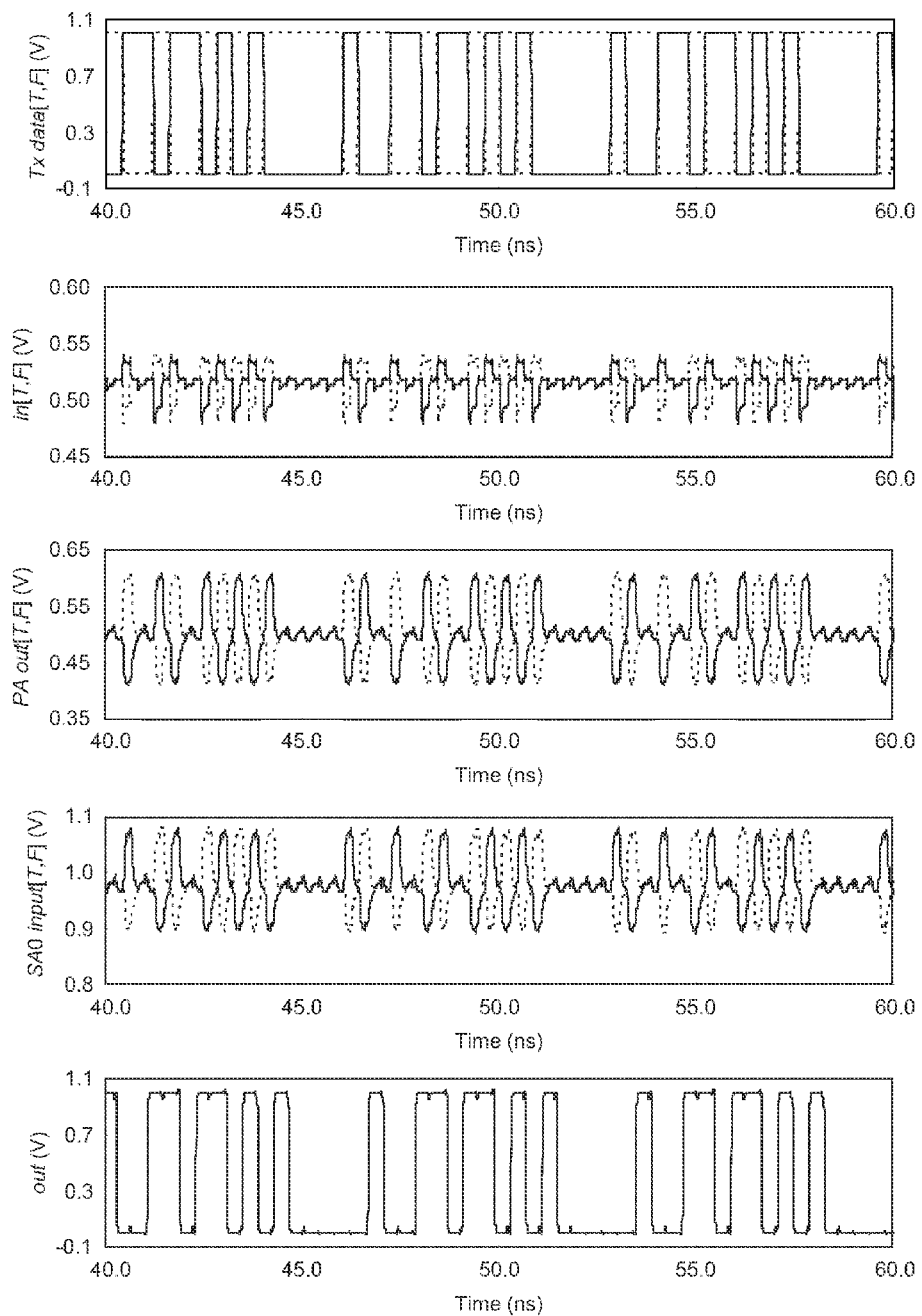
FIG. 12 is a graph illustrating operation of the circuit of FIG. 1 at a proximity-connector separation of 10 μm and with coupling capacitance (Cc) of 0.5 fF in accordance with an embodiment of the present disclosure.
Figure 13:
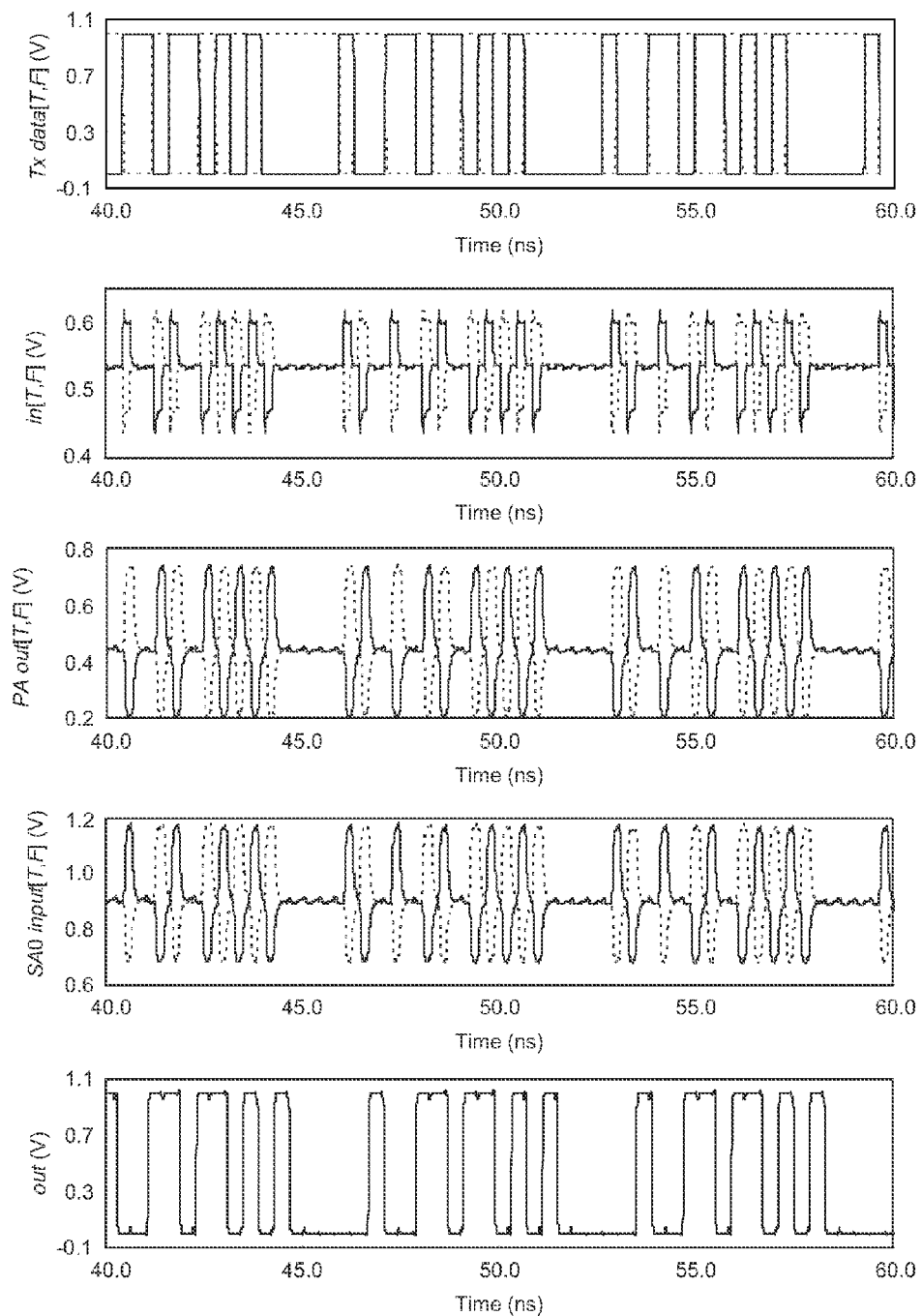
FIG. 13 is a graph illustrating operation of the circuit of FIG. 1 at a proximity-connector separation of 3 μm and with Cc of 1.4 fF in accordance with an embodiment of the present disclosure.

FIG. 12 presents a graph illustrating signals at some ports and internal nodes during operation of circuit 100 (FIG. 1) at a proximity-connector separation of 10 μm and with a coupling capacitance (Cc) of 0.5 fF. Similarly, FIG. 13 presents a graph illustrating operation of circuit 100 (FIG. 1) at a proximity-connector separation of 3 μm and with Cc of 1.4 fF. Even though the signal swing varies by a factor of about 3 times between the two cases shown, respectively, in FIG. 12 and FIG. 13, the trigger levels are always set approximately halfway between the NULL level and the maximum or minimum voltage levels. Consequently, this provides a noise margin that equals the single-ended swing.

Figure 14:
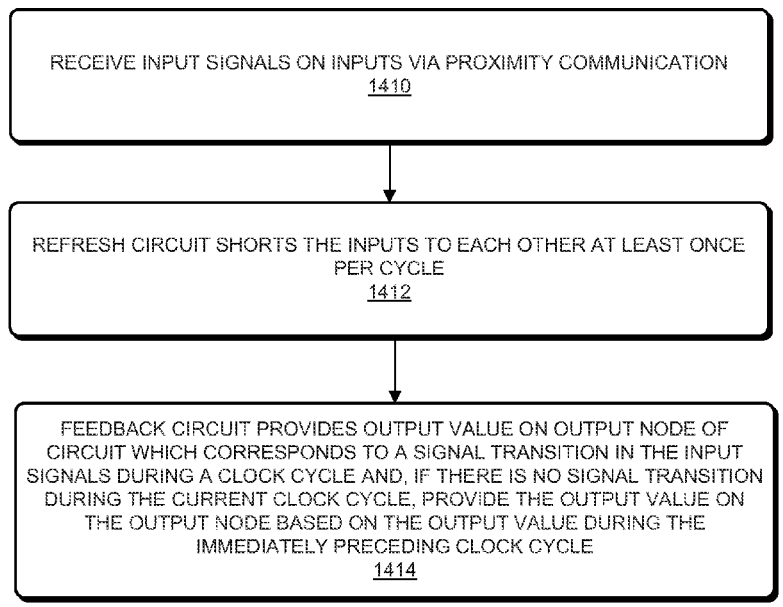
FIG. 14 is a flow chart illustrating a process for restoring DC content during proximity communication in the circuit of FIG. 1 in accordance with an embodiment of the present disclosure.

We now describe embodiments of a process for restoring DC content during proximity communication. FIG. 14 is a flow chart illustrating a process for restoring DC content during proximity communication in a circuit, such as circuit 100 (FIG. 1). During the method, the circuit receives the input signals on the inputs via proximity communication (operation 1410). Moreover, the refresh circuit shorts the inputs to each other at least once per clock cycle (operation 1412). Furthermore, the feedback circuit provides the output value on the output node of the circuit which corresponds to the signal transition in the input signals during the current clock cycle and, if there is no signal transition during the current clock cycle, provides the output value on the output node based on the output value during the immediately preceding clock cycle (operation 1414).

In some embodiments of process 1400, there may be additional or fewer operations. Moreover, the order of the operations may be changed and/or two or more operations may be combined into a single operation.

Figure 15:
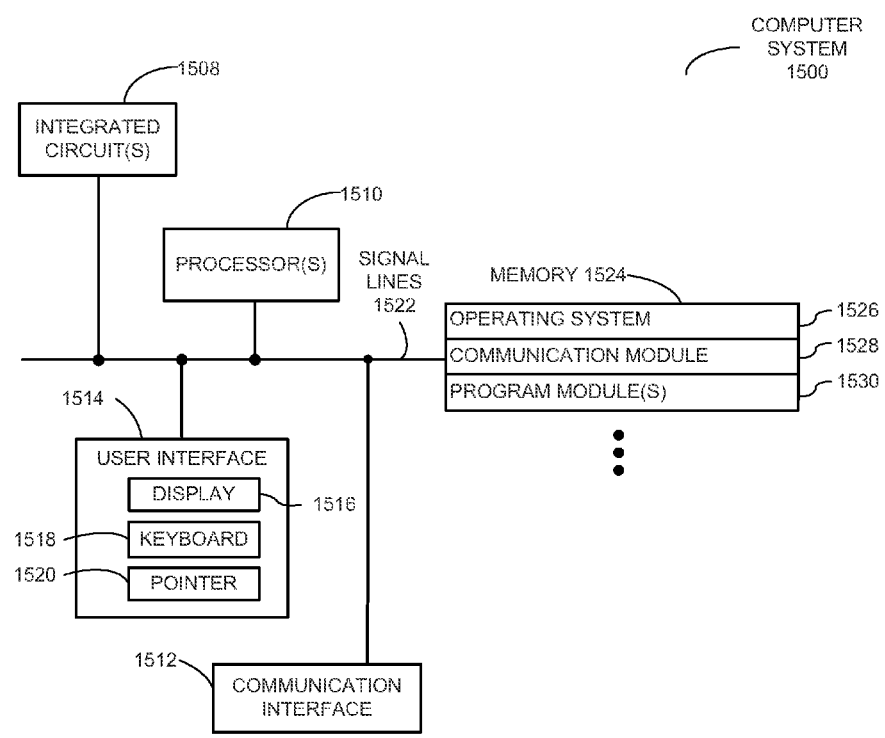
FIG. 15 is a block diagram illustrating a computer system that includes an integrated circuit with one or more instances of the circuit of FIG. 1 in accordance with an embodiment of the present disclosure.

We now describe embodiments of a computer system. FIG. 15 presents a block diagram illustrating a computer system 1500 that includes an integrated circuit with one or more instances of a circuit, such as circuit 100 (FIG. 1) and/or 900 (FIG. 9). Computer system 1500 includes: one or more processors (or processor cores) 1510, a communication interface 1512, a user interface 1514, and one or more signal lines 1522 coupling these components together. Note that the one or more processors (or processor cores) 1510 may support parallel processing and/or multi-threaded operation, the communication interface 1512 may have a persistent communication connection, and the one or more signal lines 1522 may constitute a communication bus. Moreover, the user interface 1514 may include: a display 1516, a keyboard 1518, and/or a pointer 1520, such as a mouse.

Memory 1524 in computer system 1500 may include volatile memory and/or non-volatile memory. More specifically, memory 1524 may include: ROM, RAM, EPROM, EEPROM, flash, one or more smart cards, one or more magnetic disc storage devices, and/or one or more optical storage devices. Memory 1524 may store an operating system 1526 that includes procedures (or a set of instructions) for handling various basic system services for performing hardware-dependent tasks. Moreover, memory 1524 may also store communications procedures (or a set of instructions) in a communication module 1528. These communication procedures may be used for communicating with one or more computers, devices and/or servers, including computers, devices and/or servers that are remotely located with respect to computer system 1500.

Memory 1524 may also include one or more program modules 1530 (or a set of instructions). Note that one or more of program modules 1530 may constitute a computer-program mechanism. Instructions in the various modules in the memory 1524 may be implemented in: a high-level procedural language, an object-oriented programming language, and/or in an assembly or machine language. The programming language may be compiled or interpreted, i.e., configurable or configured, to be executed by the one or more processors (or processor cores) 1510.

Computer system 1500 may also include one or more integrated circuits 1508 that include one or more instances of circuit 100 (FIG. 1). For example, the circuit(s) may be included in a multi-chip module (MCM) (such as a switch or a processor). This MCM may include an array of chip modules (CMs) or single-chip modules (SCMs), and a given SCM may include at least one semiconductor die. Note that the MCM is sometimes referred to as a 'macro-chip.' Furthermore, the semiconductor die may communicate with other semiconductor dies, CMs, SCMs, and/or devices in the MCM using proximity communication of electromagnetically coupled signals (which is referred to as 'electromagnetic proximity communication'), such as capacitively coupled signals and/or proximity communication of optical signals (which are, respectively, referred to as 'electrical proximity communication' and 'optical proximity communication'). In some embodiments, the electromagnetic proximity communication includes inductively coupled signals and/or conductively coupled signals. The instance(s) of circuit 100 (FIG. 1) may restore DC content during proximity communication within or between the semiconductor dies.

Computer system 1500 may include, but is not limited to: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. For example, integrated circuit(s) 1508 may be included in a backplane that is coupled to multiple processor blades, or integrated circuit(s) 1508 may couple different types of components (such as processors, memory, I/O devices, and/or peripheral devices). Thus, integrated circuit(s) 1508 may perform the functions of: a switch, a hub, a bridge, and/or a router. Note that computer system 1500 may be at one location or may be distributed over multiple, geographically dispersed locations.

Circuit 100 (FIG. 1), trigger-level sampler circuit 900 (FIG. 9) and/or computer system 1500 may include fewer components or additional components. For example, trigger-level sampler circuit 900 (FIG. 1) may provide trigger levels to multiple instances of circuit 100 (FIG. 1), which facilitate communication via proximity communication in multiple channels. Moreover, while feedback circuit 122 (FIG. 1) is illustrated with a path memory of one clock cycle, in some embodiments a longer path memory is used.

Furthermore, components in these circuits and systems may be implemented using PMOS, NMOS and/or CMOS. Additionally, circuits 100 (FIG. 1) and trigger-level sampler circuit 900 (FIG. 9) may be used during intra- or inter-chip proximity communication.

Although these circuits and systems are illustrated as having a number of discrete items, these embodiments are intended to be functional descriptions of the various features that may be present rather than structural schematics of the embodiments described herein. Consequently, in these embodiments, two or more components may be combined into a single component and/or a position of one or more components may be changed. Note that some or all of the functionality of the computer system 1500 may be implemented in one or more application-specific integrated circuits (ASICs) and/or one or more digital signal processors (DSPs). Furthermore, functionality in circuit 100 (FIG. 1), trigger-level sampler circuit 900 (FIG. 9) and/or computer system 1500 may be implemented more in hardware and less in software, or less in hardware and more in software, as is known in the art.

While the preceding embodiments compensated for the transistor offset in the preamplifier in circuit 100 (FIG. 1), in some embodiments offsets in subsequent stages are also compensated. This may be useful if the signal at the output of the preamplifier is not large enough to overcome an offset(s) in the subsequent stages. Furthermore, while binary signaling has been used in the preceding embodiments as an illustrative example, in other embodiments multi-level signaling (such as 3-level signaling) may be used. For example, with 3-level signaling, circuit 100 (FIG. 1) may include three sense amplifiers and three corresponding sets of trigger voltage inputs. In addition, feedback circuit 122 (FIG. 1) may select between the outputs from the three sense amplifiers.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A circuit, comprising:
   a receiver circuit, having inputs electrically coupled to receiver proximity connectors, which receive input signals via proximity communication;
   a refresh circuit, electrically coupled to the inputs, configured to short the inputs to one another at least once per clock cycle; and
   a feedback circuit configured to provide an output value on an output node of the circuit corresponding to a signal transition in the input signals during a current clock cycle and, if there is no signal transition during the current clock cycle, to provide the output value on the output node based on the output value during an immediately preceding clock cycle,
   wherein the feedback circuit comprises:
      a multiplexer, wherein a first data input of the multiplexer is electrically coupled to an output of a first sense amplifier, wherein a second data input of the multiplexer is electrically coupled to an output of a second sense amplifier, and wherein each of the first sense amplifier and the second sense amplifier is electrically coupled to outputs from the receiver circuit;
      a delay element configured to receive an output of the multiplexer and to generate a signal on an output node of the delay circuit based on a predetermined delay, wherein the output node of the delay element is electrically coupled to the output node of the circuit; and
      a memory element configured to store the output value from the immediately preceding clock cycle, wherein a data input of the memory element is electrically coupled to the output of the delay circuit, and wherein an output of the memory element is electrically coupled to a select input of the multiplexer.

2. The circuit of claim 1, wherein the proximity communication is via at least one of capacitive coupling to transmitter proximity connectors, inductive coupling to the transmitter proximity connectors, and optical coupling to the transmitter proximity connectors.

3. The circuit of claim 1, wherein the circuit is disposed on an integrated circuit; and
   wherein the proximity communication is with another integrated circuit.

4. The circuit of claim 1, wherein the circuit is disposed on an integrated circuit; and
   wherein the proximity communication is with another circuit on the integrated circuit.

5. The circuit of claim 1, wherein DC content of the input signals is lost during the proximity communication; and
   wherein, by providing the output value on the output node based at least in part on the output value during the immediately preceding clock cycle, the feedback circuit restores the DC content.

6. The circuit of claim 1, wherein the feedback circuit has a path memory of one clock cycle.

7. The circuit of claim 1, further comprising:
   a first voltage-threshold node and a second voltage-threshold node, electrically coupled to the first sense amplifier, configured to receive a first voltage threshold and a second voltage threshold, which respectively bias the first sense amplifier toward a logical high state and a logical low state; and
   a third voltage-threshold node and a fourth voltage-threshold node, electrically coupled to the second sense amplifier, configured to receive the second voltage threshold and the first voltage threshold so that the second sense amplifier is biased toward opposite logical states than the first sense amplifier.

8. The circuit of claim 7, wherein the first threshold voltage and the second threshold voltage are fixed.

9. The circuit of claim 7, wherein the first threshold voltage and the second threshold voltage are dynamically adapted based at least in part on a voltage swing of the input signals.

10. The circuit of claim 9, wherein the first threshold voltage and the second threshold voltage are dynamically adapted using a sampler circuit in a side channel that approximates the circuit.

11. The circuit of claim 1, further comprising capacitors between the outputs from the receiver circuit and inputs to the first sense amplifier and the second sense amplifier, wherein the capacitors provide voltage offset compensation.

12. The circuit of claim 1, wherein the delay element is configured to satisfy setup and hold parameters of the memory element.

13. A computer system, comprising a semiconductor die that includes a circuit, wherein the circuit includes:
   a receiver circuit, having inputs electrically coupled to receiver proximity connectors, which receive input signals via proximity communication;
   a refresh circuit, electrically coupled to the inputs, configured to short the inputs to one another at least once per clock cycle; and
   a feedback circuit configured to provide an output value on an output node of the circuit corresponding to a signal transition in the input signals during a current clock cycle and, if there is no signal transition during the current clock cycle, to provide the output value on the output node based at least in part on the output value during an immediately preceding clock cycle,
   wherein the feedback circuit comprises:
      a multiplexer, wherein a first data input of the multiplexer is electrically coupled to an output of a first sense amplifier, wherein a second data input of the multiplexer is electrically coupled to an output of a second sense amplifier, and wherein each of the first sense amplifier and the second sense amplifier is electrically coupled to outputs from the receiver circuit;
      a delay element configured to receive an output of the multiplexer and to generate a signal on an output node of the delay circuit based on a predetermined delay, wherein the output node of the delay element is electrically coupled to the output node of the circuit; and
      a memory element configured to store the output value from the immediately preceding clock cycle, wherein a data input of the memory element is electrically coupled to the output of the delay circuit, and wherein an output of the memory element is electrically coupled to a select input of the multiplexer.

14. The computer system of claim 13, wherein DC content of the input signals is lost during the proximity communication; and
   wherein, by providing the output value on the output node based at least in part on the output value during the immediately preceding clock cycle, the feedback circuit restores the DC content.

15. A method for restoring DC content during proximity communication, comprising:
   using a receiver circuit to receive input signals on inputs to a circuit via proximity communication;
   shorting the inputs to each other using a refresh circuit at least once per clock cycle; and using a feedback circuit to provide an output value on an output node of the circuit corresponding to a signal transition in the input signals during a current clock cycle and, if there is no signal transition during the current clock cycle, to provide the output value on the output node based on the output value during an immediately preceding clock cycle, wherein the feedback circuit comprises:
  a multiplexer, wherein a first data input of the multiplexer is electrically coupled to an output of a first sense amplifier, wherein a second data input of the multiplexer is electrically coupled to an output of a second sense amplifier, and wherein each of the first sense amplifier and the second sense amplifier is electrically coupled to outputs from the receiver circuit;
  a delay element configured to receive an output of the multiplexer and to generate a signal on an output node of the delay circuit based on a predetermined delay, wherein the output node of the delay element is electrically coupled to the output node of the circuit; and
  a memory element configured to store the output value from the immediately preceding clock cycle, wherein a data input of the memory element is electrically coupled to the output of the delay circuit, and wherein an output of the memory element is electrically coupled to a select input of the multiplexer.

16. The circuit of claim 1, wherein, if there is a signal transition during the current clock cycle, the refresh circuit is configured to short the inputs to one another during the current clock cycle after the receiver circuit captures the signal transition in the input signals that corresponds to the output value.

17. The circuit of claim 12, wherein the memory element includes a flip-flop.

* * * * *

UNITED STATES PATENT AND TRADEMARK OFFICE
CERTIFICATE OF CORRECTION

PATENT NO. : 8,798,530 B2  
APPLICATION NO. : 12/494492  
DATED : August 5, 2014  
INVENTOR(S) : Chow et al.

Page 1 of 1

It is certified that error appears in the above-identified patent and that said Letters Patent is hereby corrected as shown below:

In the Specification

In column 8, line 9, delete "(FE)" and insert -- (FF) --, therefor.

In column 8, line 67, delete "sin [T,F]" and insert -- sin[T,F] --, therefor.

In column 9, line 5, delete "sin [T,F]," and insert -- sin[T,F], --, therefor.

In column 9, line 14, delete "sin [T]." and insert -- sin[T]. --, therefor.

Signed and Sealed this  
Seventeenth Day of March, 2015

Michelle K. Lee  
*Director of the United States Patent and Trademark Office*